(12) United States Patent
Maeda et al.

(10) Patent No.: US 6,819,989 B2
(45) Date of Patent: Nov. 16, 2004

(54) DRIVE RECORDER SYSTEM

(75) Inventors: Takashi Maeda, Tokyo (JP); Hiroshi Hujioka, Tokyo (JP); Takanori Matsunaga, Tokyo (JP); Toshinori Matsui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 17 days.

(21) Appl. No.: 09/985,834

(22) Filed: Nov. 6, 2001

(65) Prior Publication Data

US 2002/0161497 A1 Oct. 31, 2002

(30) Foreign Application Priority Data

Apr. 27, 2001 (JP) ........................................ 2001-131959

(51) Int. Cl.[7] .............................................. G06F 17/00
(52) U.S. Cl. ........................................................ 701/35
(58) Field of Search ........................ 701/35, 48; 369/21

(56) References Cited

U.S. PATENT DOCUMENTS 4,843,557 A * 6/1989 Ina et al. .................... 701/114
5,848,365 A * 12/1998 Coverdill ...................... 701/35
6,073,063 A * 6/2000 Leong Ong et al. .......... 701/35
6,233,509 B1 * 5/2001 Becker ......................... 701/29

FOREIGN PATENT DOCUMENTS

| JP | 8-331157 | 12/1996 | | |
| JP | 8-331158 | 12/1996 | | |
| JP | 2000124941 A | * | 4/2000 | ........... H04L/12/46 |

OTHER PUBLICATIONS

Xing et al.; The application of controller area network on vehicle; Sep. 1999,;IEEE–IVEC '99; vol.1, pp. 455–458.*
Klausner et al.; Vehicle data management system with remote access to electronic control unit–internal states; Sep. 2001; IEE Conf. Publ. No. 483; pp. 68–72.*

* cited by examiner

Primary Examiner—Michael J. Zanelli
(74) Attorney, Agent, or Firm—Sughrue Mion, PLLC

(57) ABSTRACT

A drive recorder system includes vehicle control devices that conduct arithmetic operation on the basis of input information from sensors and outputs the arithmetic operation result to an actuator to control a vehicle, in-vehicle LANs which are connected with the vehicle control devices, a gateway that mutually connects the in-vehicle LANs to enable communication, and a recording device which is mounted on the gateway and records the data outputted from the vehicle control device.

1 Claim, 5 Drawing Sheets

DRIVE RECORDER SYSTEM

This application is based on Application No. 2001-131959, filed in Japan on Apr. 27, 2001, the contents of which are hereby incorporated by reference.

BACKGROUND OF THE INVENTION

1. Field of the Invention

The present invention relates to a drive recorder system that records the data of a traveling vehicle.

2. Description of the Related Art

A conventional drive recorder system will be described with reference to FIG. 5. FIG. 5 is a diagram showing the structure of a conventional drive recorder system disclosed in, for example, Japanese Patent Application Laid-open No. 8-331157.

In FIG. 5, reference numeral 1 denotes a measuring device that has a plurality of sensors 1S and measures the travel state of a vehicle, numeral 2 indicates a recording device that records data D outputted from the measuring device 1, numeral 3 indicates a control device that controls an actuator and the like in accordance with the data D, numeral 4 indicates an in-vehicle LAN that mutually connects the recording device 2 and the control device 3. Although there are a variety of control devices 3, they will be omitted from the figure.

Next, the operation of the conventional driver recorder system will be described with reference to FIG. 5.

In the conventional drive recorder system thus structured, when the vehicle starts to travel, the travel sensor D calculated on the basis of the detection signals from the sensors 1S is outputted to the in-vehicle LAN 4 from the measuring device 1 at a given timing. The data D outputted to the in-vehicle LAN 4 is transmitted to the recording device 2 and the control device 3. The control device 3 controls the actuator and the like on the basis of the received data D. Also, the recording device 2 records the received data D in a memory.

In the case where the above-described conventional drive recorder system is applied to an existing vehicle in which the vehicle control devices are connected to each other by the in-vehicle LAN 4, it is necessary that the recording device 2 as well as the measuring device 1 should be connected to the in-vehicle LAN 4 in addition to the vehicle control device 3 mounted in the vehicle in advance. For that reason, there arises such a problem that the costs and weight of the entire vehicle increase.

Also, in the case where the conventional drive recorder system is applied to the existing vehicle in which a plurality of in-vehicle LANs are connected by a gateway, there has been proposed, for example, a method in which at least one measuring device is arranged on each of the in-vehicle LANs, and the recording device is arranged in a specific in-vehicle LAN. In this case, the data from the measuring device connected to each of the in-vehicle LANs is transmitted to the in-vehicle LAN which is connected with the recording device through the gateway. For that reason, there arises a problem that the communication load on the in-vehicle LAN connected with the recording device is concentratingly increased.

In addition, in the case where the conventional drive recorder system is applied to the existing vehicle in which the vehicle control devices are connected to each other by the in-vehicle LAN, there arises a problem that the communication load on the in-vehicle LAN becomes higher than that before the drive recorder system is applied by the amount of communications of the data outputted to the recording device from the-measuring device.

SUMMARY OF THE INVENTION

The present invention has been made to solve the above-mentioned problems in the conventional system, and therefore a first object of the present invention is to provide a drive recorder system that requires no measuring device unlike the conventional system in the case where a drive recorder system is applied to an existing vehicle in which vehicle control devices are connected to each other by an in-vehicle LAN.

A second object of the present invention is to provide a drive recorder system that does not concentratingly increase the communication load on a specific in-vehicle LAN unlike the conventional system.

A third object of the present invention is to provide a drive recorder system that can suppress an increase in the communication load of the in-vehicle LAN in the case where the drive recorder system is applied to the existing vehicle in which the vehicle control devices are connected to each other by the in-vehicle LAN.

In order to achieve the above object, according to a first aspect of the present invention, there is provided a drive recorder system comprising: a vehicle control device that conducts arithmetic operation on the basis of input information from sensors and outputs an arithmetic operation result to an actuator to control a vehicle; first and second in-vehicle LANs each of which is connected with at least one of said vehicle control devices; a gateway that mutually connects said first and second in-vehicle LANs to enable communication; and a recording device that is mounted on said gateway and records data outputted from said vehicle control device.

According to a second aspect of the present invention, there is provided a drive recorder system in which said vehicle control device outputs the data to said recording device at a predetermined cycle, and in which said recording device records the data transmitted from said vehicle control device at the predetermined cycle.

According to a third aspect of the present invention, there is provided a drive recorder system in which said vehicle control device outputs the data to said recording device at an arbitrary cycle, and in which said recording device records the data transmitted from said vehicle control device at the arbitrary cycle.

According to a fourth aspect of the present invention, there is provided a drive recorder system in which said recording device inquires of said vehicle control device an output of the data at a predetermined cycle, records the data transmitted in response to the output inquiry, and in which said vehicle control device outputs the data to said recording device in response to the output inquiry of said recording device.

According to a fifth aspect of the present invention, there is provided a drive recorder system in which said recording device inquires of said vehicle control device an output of the data at an arbitrary cycle, records the data transmitted in response to the output inquiry, and in which said vehicle control device outputs the data to said recording device in response to the output inquiry of said recording device.

According to a sixth aspect of the present invention, there is provided a drive recorder system further comprising a sensor node that is connected to said first in-vehicle LAN and measures a vehicle travel state by a sensor, and in which said recording device records the data outputted from said vehicle control device and a sensor detection value outputted from said sensor node.

According to a seventh aspect of the present invention, there is provided a drive recorder system in which said vehicle control device transmits the data to another vehicle control device and receives the data transmitted from said another vehicle control device, and in which said recording device refers to transmit/receive data between the vehicle control devices which is transmitted on said first and second in-vehicle LANs, and records at least a part of the transmit/receive data.

According to an eighth aspect of the present invention, there is provided a drive recorder system in which said recording device includes arithmetically operating means for arithmetically operating the data outputted from said vehicle control device and records the arithmetic operation result of said arithmetically operating means together with the data.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

First Embodiment

Figure 1:
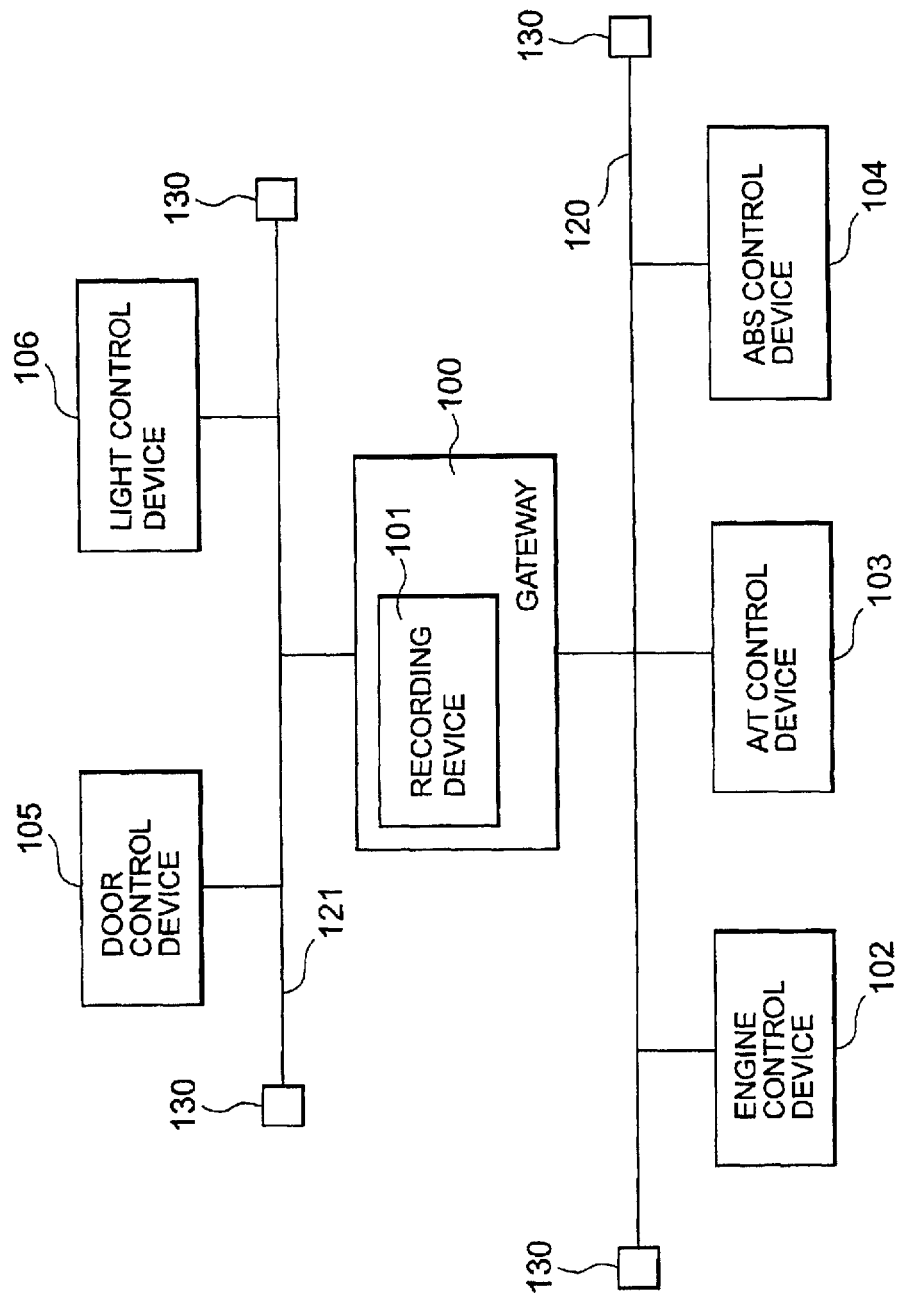
FIG. 1 is a diagram showing the structure of a drive recorder system in accordance with a first aspect of the present invention.

A drive recorder system according to a first embodiment of the present invention will be described with reference to the drawings. FIG. 1 is a diagram showing the structure of a drive recorder system in accordance with a first embodiment of the present invention. In the respective drawings, the same reference numerals indicate the same or like parts.

Referring to FIG. 1, reference numeral 100 denotes a gateway, numeral 101 indicates a recording device mounted on the gateway 100, numeral 102 indicates an engine control device that controls an engine, numeral 103 indicates an A/T control device that controls an automatic transmission, numeral 104 indicates an ABS control device that controls a brake, numeral 105 indicates a door control device that can detect the open/close operation of doors, numeral 106 indicates a light control device that controls the lighting of a lamp, numerals 120 and 121 indicate in-vehicle LANs, and numeral 130 indicates a terminal resistor.

Also, in the figure, the in-vehicle LAN 120 is made up of a high-speed CAN, the in-vehicle LAN 121 is made up of a low-speed CAN, and the gateway 100 connects the high-speed CAN 120 and the low-speed CAN 121.

In addition, in the figure, the engine control device 102, the A/T control device 103 and the ABS control device 104 are connected to each other by the high-speed CAN 120. Also, the door control device 105 and the light control device 106 are mutually connected to each other by the low-speed CAN 121. The engine control device 102, the A/T control device 103 and the ABS control device 104, which are connected to the high-speed CAN 120, and the door control device 105 and the light control device 106, which are connected to the low-speed CAN 122, are mutually connected to each other through the gateway 100.

The engine control device 102 includes a plurality of sensors such as a throttle opening degree sensor and an $O_2$ sensor, and conducts arithmetic operation with the use of the detected value of those sensors to control the engine. Other control devices 103 to 106 are also structured in the same manner as that of the engine control device 102, and conducts the arithmetic operation to control an object to be controlled.

The recording device 101 mounted on the gateway 100 records the data outputted from the engine control device 102, the A/T control device 103, the ABS control device 104, the door control device 105 and the light control device 106.

Next, the operation of the drive recorder system in accordance with the first embodiment of the present invention will be described with reference to the drawings.

Figure 2:
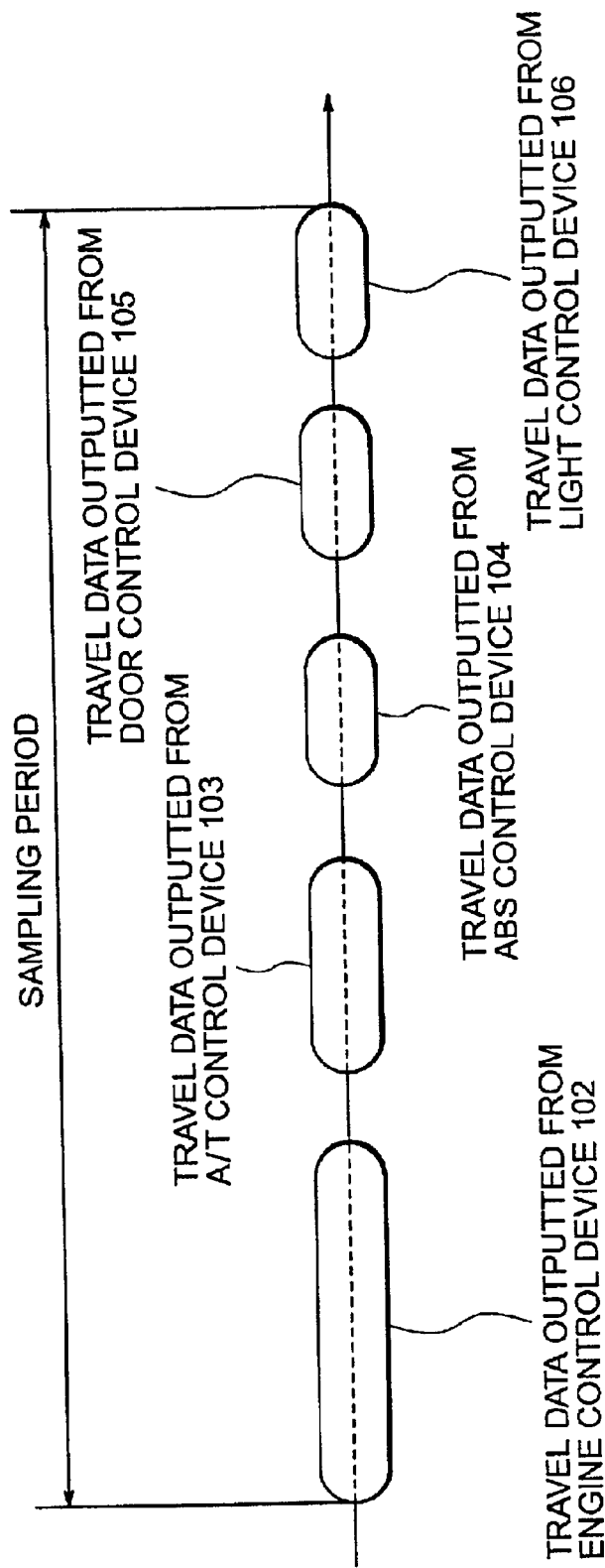
FIG. 2 is a timing chart showing the operation of the drive recorder system in accordance with the first aspect of the present invention.

FIG. 2 is a timing chart showing the data outputted from the respective vehicle control devices of the drive recorder system to the recording device per sampling cycle in accordance with the first embodiment of the present invention.

When the vehicle starts to travel, the vehicle control devices 102, 103, 104, 105 and 106 start to control objects to be controlled, respectively, and the recording device 101 also starts to operate.

The engine control device 102 periodically outputs the throttle opening degree sensor, the vehicle speed and the engine r.p.m. to the in-vehicle LANs 120 and 121 for the recording device 101. Similarly, the A/T control device 103 periodically outputs the shift position, the ABS control device 104 periodically outputs brake lamp switch information, the door control device 105 periodically outputs door lock information, and the light control device 106 periodically outputs the lamp lighting information, respectively, to the in-vehicle LANs 120 and 121 for the recording device 101.

The vehicle control devices 102 to 106 include an output function of outputting the data to the recording device 101 and a timing management function of managing the output timing of the data produced by the output function. The respective vehicle control devices 102 to 106 output the data at a timing regulated as shown in FIG. 2. The recording device 101 records the data outputted from the respective vehicle control devices and a time measured by the recording device 101 with one period of sampling from the data outputted from the engine control device 102 to the data outputted from the light control device 106. The vehicle control devices 102 to 106 may output the data to the recording device 101 at an arbitrary timing.

For example, if a traffic accident occurs, the data recorded in the above manner is employed for analyzing the action of the vehicle and the operation state before and after the traffic accident. For example, it can be judged whether the lamp has been lighted appropriately, or not, during travel at night, on the basis of the time recorded in the recording device 101 and the lamp lighting information from the light control device 106.

As described above, according to the first embodiment of the present invention, the data such as the detection value of the sensor provided in each of the vehicle control device and the arithmetic operation result arithmetically operated for controlling the object to be controlled by each of the vehicle control devices is outputted to the in-vehicle LANs 120 and 121 from the respective vehicle control devices 102 to 106 for the recording device 101, and then recorded by the recording device 101. For that reason, it is unnecessary to add any dedicated measuring device for the drive recorder system, and an increase in the costs and weight of the vehicle can be suppressed to be lower than that in the conventional system.

Also, for example, in the case where the recording device 101 is connected to the high-speed CAN 120, the data outputted from the vehicle control devices 105 and 106 on the low-speed CAN 121 to the recording device 101 is outputted to the high-speed CAN 120 through the gateway 100 and then received by the recording device 101. For that reason, the communication load on the high-speed CAN 120 increases as much as the data outputted to the recording device 101 from all of the vehicle control devices. In contrast, according to the first embodiment, because the recording device 101 is mounted on the gateway 100, the data outputted from the vehicle control devices 105 and 106 mounted on the low-speed CAN 121 to the recording device 101 is not outputted onto the high-speed CAN 120. For that reason, the communication load of a specific in-vehicle LAN can be prevented from being concentratedly increased.

Also, the respective vehicle control devices output the data to the recording device 101 at a given timing, and the data is recorded by the recording device 101. For that reason, it is unnecessary to transmit the data request to the vehicle control devices from the recording device 101, and an increase in the communication load on the in-vehicle LAN due to addition of the drive recorder system can be suppressed as much as the data outputted to the recording device 101.

That is, because the vehicle control devices 102 to 106 and the recording device 101 are connected by the in-vehicle LANs 120 and 121 to record the data outputted from the vehicle control device by the recording device, it is unnecessary to add a dedicated measuring device for the drive recorder system, and an increase in the costs and weight of the vehicle can be suppressed to be lower than that of the conventional example.

Also, because the recording device 101 is mounted on the gateway 100 connected with the plurality of in-vehicle LANs 120 and 121, the communication load on a specific in-vehicle LAN can be prevented from being concentratedly increased by application of the drive recorder system.

In addition, the data is outputted to the in-vehicle LAN at a given timing which is managed by the vehicle control device and then received by the recording device 101 where the data is recorded. For that reason, no procedural data other than the data is required, thereby making it possible to suppress an increase in the communication load on the in-vehicle LAN.

Second Embodiment

The respective vehicle control devices do not output the data to the recording device 101 at the given timing as in the above-described first embodiment, but it is possible that the recording device 101 inquires of the respective vehicle control devices 102 to 106 the output of the data, and the respective vehicle control devices outputs the data to the recording device 101 in response to that inquiry.

The recording device 101 has an output inquiry function of inquiring of the respective vehicle control devices 102 to 106 the output of the data, and the respective vehicle control devices 102 to 106 include an output inquiry response function of outputting the data in response to the output inquiry.

Hereinafter, the operation of the drive recorder system in accordance with the second embodiment will be described.

First, the recording device 101 outputs a message that inquires of the engine control device 102 the output of the data onto the high-speed CAN 120. Upon receiving the above message, the engine control device 102 transmits the data to the recording device 101, and the data is received by the recording device 101 and then recorded.

The recording device 101 collects and records the data from the A/T control device 103 in the same manner as that described above, for example, 20 ms after the recording device 101 has outputted the message that inquires of the engine control device 102 of the output of the data.

Hereinafter, likewise, the recording device 101 collects the data from the ABS control device 104, the door control device 105 and the light control device 106 and then records the data therein at intervals of 20 ms.

In this way, the collecting and recording operation of the data is periodically repeated at the time interval of 100 ms (20 ms×5) in one cycle with the collection and record of the data by the engine control device 102 to the light control device 106 as one cycle.

Also, in the case where the communication load on the in-vehicle LANs 120 and 121 is high, the output inquiry of the data is made not at the interval of 20 ms, but at the interval of, for example, 30 ms. The recording device 101 may inquire of the respective vehicle control devices 102 to 106 the output of the data at an arbitrary timing.

As described above, according to the second embodiment, the data is outputted from the respective vehicle control devices 102 to 106 in response to the inquiry from the recording device 101, and then received and recorded by the recording device 101. For that reason, the data can be transmitted and received in a systematic manner.

Third Embodiment

Figure 3:
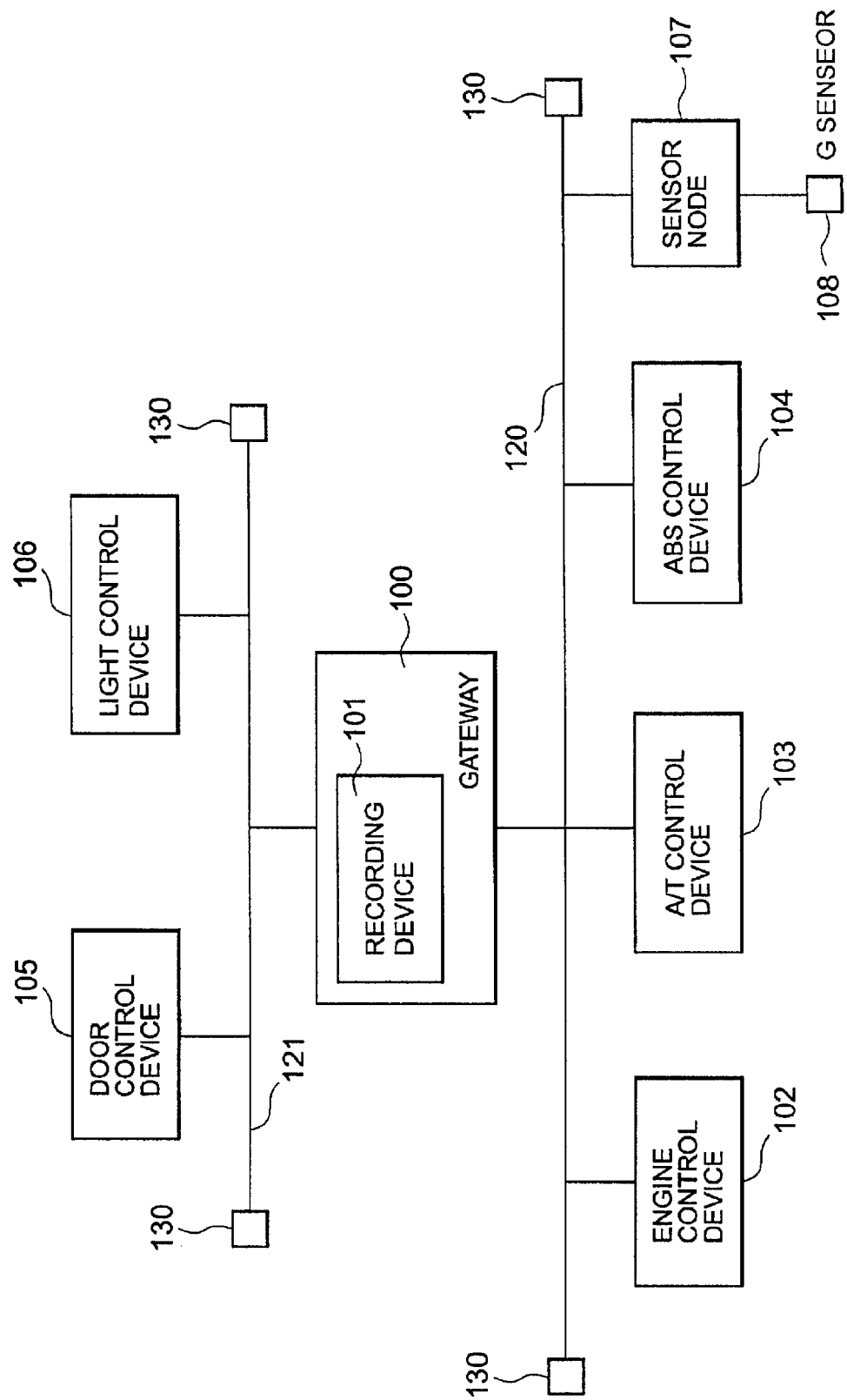
FIG. 3 is a diagram showing the structure of a drive recorder system in accordance with a third embodiment of the present invention.

A drive recorder system in accordance with a third embodiment of the present invention will be described with reference to the drawings. FIG. 3 is a diagram showing the structure of the drive recorder system in accordance with the third embodiment of the present invention.

As shown in FIG. 3, a sensor node 107 having a G sensor 108 is connected to the high-speed CAN 120 in addition to the structure of the above-described first embodiment so that the detection value of the G sensor 108 which is outputted by the sensor node 107 may be also recorded by the recording device 101.

Because an acceleration that is exerted on the vehicle can be presumed from the value of the G sensor 108, this embodiment is applicable to a case in which the vehicle action is analyzed after a traffic accident occurs. As described above, in the case where a sensor value that is not obtained from the sensor control device mounted in the vehicle, or the like is required, only the sensor node having that sensor is added, and the sensor value is recorded together with the data outputted from the vehicle control device, thereby making it possible to complement the recording data within the recording device.

Fourth Embodiment

Figure 4:
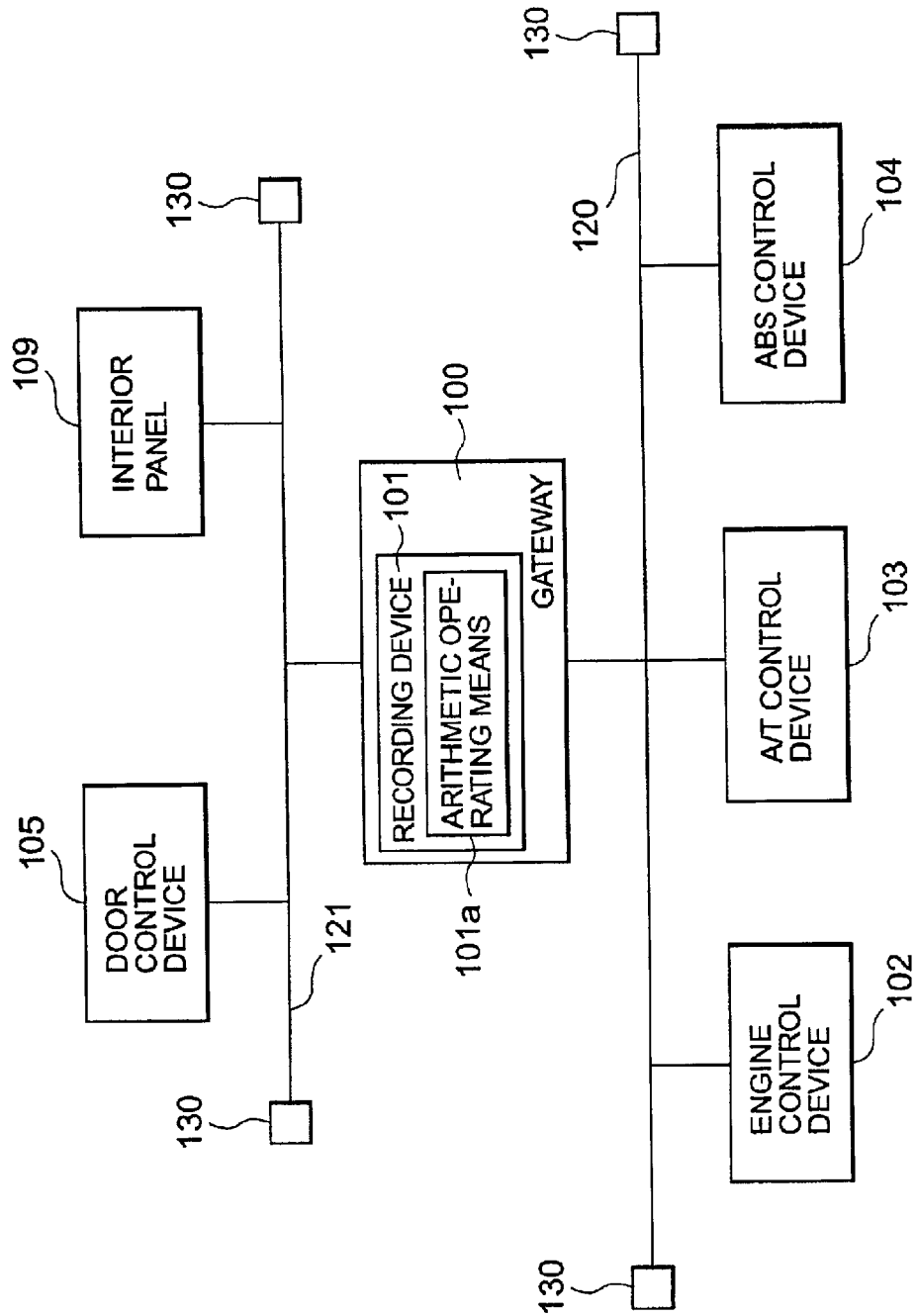
FIG. 4 is a diagram showing the structure of a drive recorder system in accordance with a fourth embodiment of the present invention.
Figure 5:
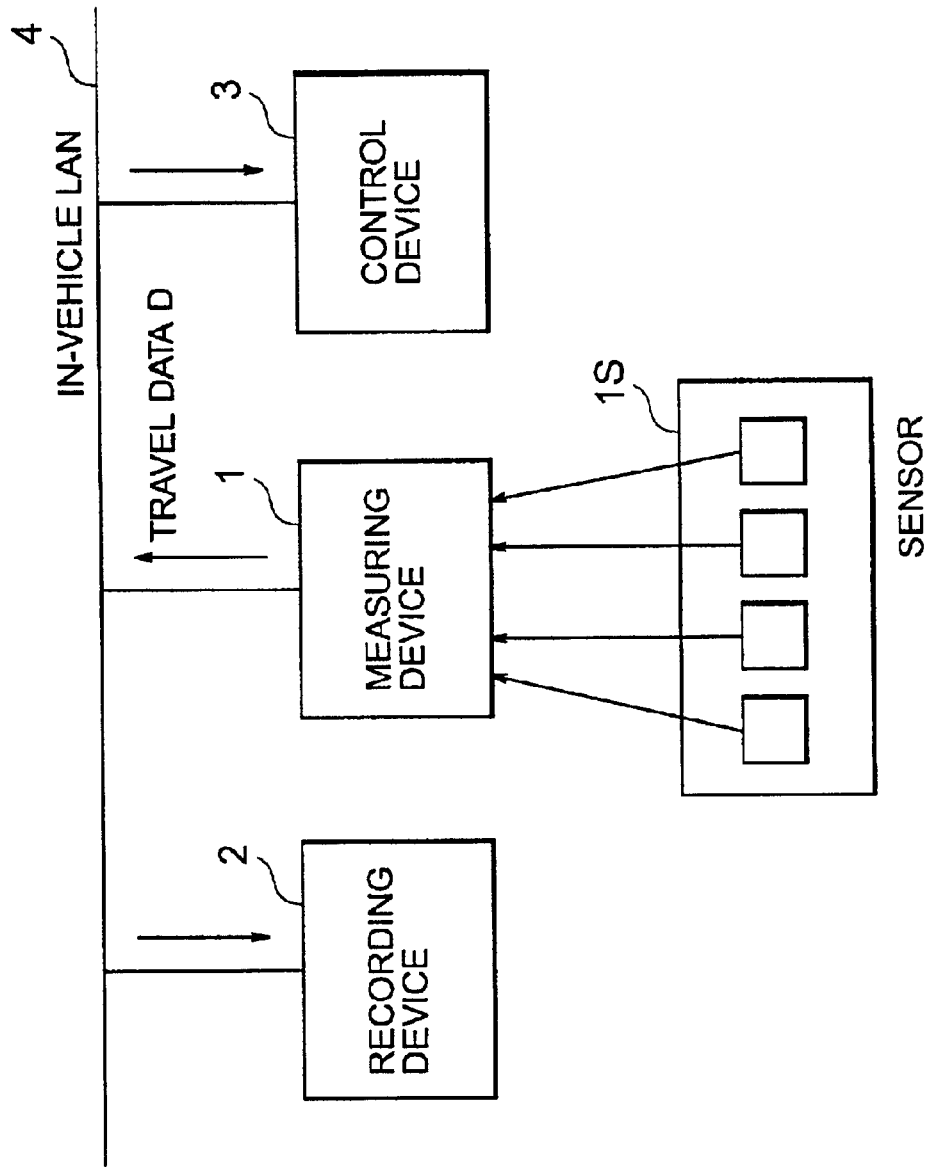
FIG. 5 is a diagram showing the structure of a conventional drive recorder system.

A drive recorder system in accordance with a fourth embodiment of the present invention will be described with reference to the drawing. FIG. 4 is a diagram showing the structure of a drive recorder system in accordance with the fourth embodiment of the present invention.

Referring to FIG. 4, reference numeral 109 denotes an interior panel section that indicates various vehicle information to a driver, and other structures are identical with those of FIG. 1.

The vehicle control device has a transmission function of transmitting the data to another vehicle control device and a receiving function of receiving the data transmitted from another vehicle control device. Also, the recording device 101 refers to the transmit/receive data between the vehicle control devices which is transmitted on the in-vehicle LAN and records at least a part of the transmit/receive data.

The respective control devices 102 to 105 shown in FIG. 4 mutually communicate the data to control the vehicle. For example, the engine control device 102 transmits the vehicle velocity and the engine r.p.m. to the interior panel section 109. Similarly, the A/T control device 103 transmits the shift position to the interior panel section 109, the ABS control device 104 transmits the ABS operation information to the interior panel section 109, and the door control device 105 transmits the door open/close information to the interior panel section 109. Those respective data is received by the interior panel section 109 and indicated for the driver.

The respective data transmitted to the above interior panel 109 is transmitted as the messages on the CANs 120 and 121. A message ID is allocated to each of the CAN messages, and at the transmitting side, an appropriate message ID is allocated to the message and then transmitted onto the CAN bus. At the receiving side, the CAN bus is monitored, and a necessary message is identified from the message ID and received. The message ID is information independent from the node information and a plurality of nodes can receive the same message.

The recording device 101 continues to monitor the CAN messages flowing on the high-speed CAN 120 and the low-speed CAN 121, and identifies the message ID of the message which is transmitted to the above interior panel section 109. Then, the recording device 101 reads the message from the CAN bus and then receives the message. The recording device 101 extracts data required for recording, for example, the vehicle velocity and the shift position from the message thus received, and then records the extracted data.

As described above, according to the fourth embodiment, the recording device 101 receives the data, for example, which is transmitted to the interior panel section 109, and extracts only the necessary data from the message and records the extracted data. Therefore, because a specific communication is not conducted between each of the vehicle control devices and the recording device 101, the drive recorder system is applicable without increasing the communication load on the in-vehicle LANs 120 and 121.

Fifth Embodiment

Also, for example, a value of the throttle opening degree sensor may be periodically transmitted to the recording device 101 from the engine control device 102 in addition to the above fourth embodiment.

The recording device 101 records the data which is transmitted to the interior panel section 109 and also records the value of the above throttle opening degree sensor as shown in the fourth embodiment.

According to the fifth embodiment, the recording device 101 receives the data which is transmitted to the interior panel section 109, and extracts and records the necessary data. Also, the recording device 101 transmits only the necessary from the vehicle control device to the recording device 101 where the necessary data is recorded, thereby making it possible to suppress an increase in the communication load on the in-vehicle LAN. In this way, according to the fifth embodiment, the increase in the communication load on the high-speed CAN 120 can be suppressed as much as the amount of transmission of the throttle opening degree sensor.

As shown in FIG. 4, the recording device 101 may include arithmetically operating means 101a that conducts arithmetic operation on the basis of the data outputted from the vehicle control devices and record the arithmetic operation result together with the data. Since the arithmetic operation result is recorded in addition to the data, the data which cannot be obtained from the vehicle control devices can be recorded.

The foregoing description of the preferred embodiments of the invention has been presented for purposes of illustration and description. It is not intended to be exhaustive or to limit the invention to the precise form disclosed,-and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A drive recorder system comprising:

at least one vehicle control device that conducts arithmetic operation on the basis of input information from sensors and outputs data to an actuator to control a vehicle;

a first and second in-vehicle LAN each of which is connected with the at least one vehicle control device;

a gateway that mutually connects said first and second in-vehicle LANs to enable communication; and a recording device that is mounted on said gateway and records the data outputted from the at least one vehicle control device, wherein said recording device includes arithmetically operating means for arithmetically operating upon the data outputted from said at least one vehicle control device and records the arithmetic operation result of said arithmetically operating means together with the data.

* * * * *